United States Patent
Younis (10) Patent No.: US 7,039,098 B2
(45) Date of Patent: May 2, 2006

(54) METHOD AND APPARATUS FOR BASE STATION AND MOBILE STATION TIME CALIBRATION

(75) Inventor: Saed Younis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 753 days.

(21) Appl. No.: 09/923,001

(22) Filed: Aug. 3, 2001

(65) Prior Publication Data
US 2002/0085627 A1 Jul. 4, 2002

Related U.S. Application Data (60) Provisional application No. 60/223,459, filed on Aug. 7, 2000.

(51) Int. Cl.
*H04B 1/69* (2006.01)

(52) U.S. Cl. .............. 375/149; 375/145; 375/148; 455/67.16; 455/456.1; 455/456.2; 455/457; 455/502

(58) Field of Classification Search ............... 375/149, 375/211, 150, 147, 145, 141, 148; 370/335, 370/350, 441; 455/456.2, 130, 440, 456.1, 455/456.5, 502, 67.16, 457; 342/387, 357.03, 342/363
See application file for complete search history.

(56) References Cited

U.S. PATENT DOCUMENTS

| | | | |
|---|---|---|---|
| 5,596,330 A | | 1/1997 | Yokev et al. ............... 342/387 |
| 5,875,402 A | * | 2/1999 | Yamawaki .................. 455/502 |
| 6,094,562 A | * | 7/2000 | Zhong .................... 455/67.16 |
| 6,173,005 B1 | * | 1/2001 | Kotzin et al. ............... 375/141 |
| 6,188,354 B1 | * | 2/2001 | Soliman et al. ............. 342/387 |
| 6,201,802 B1 | * | 3/2001 | Dean .......................... 370/350 |
| 6,275,705 B1 | * | 8/2001 | Drane et al. ............. 455/456.2 |
| 6,421,330 B1 | * | 7/2002 | Chung et al. ............... 370/335 |
| 6,658,258 B1 | * | 12/2003 | Chen et al. .............. 455/456.1 |

FOREIGN PATENT DOCUMENTS

WO 9911083 3/1999

\* cited by examiner

*Primary Examiner*—Stephen Chin
*Assistant Examiner*—Ted M. Wang
(74) *Attorney, Agent, or Firm*—Philip Wadsworth; Bruce W. Greenhaus; Andrea L. Mays (57) ABSTRACT

A method and apparatus for calibrating a Base Station and Mobile Station for use in systems that use round trip delay and systems that do not use round trip delay.

14 Claims, 6 Drawing Sheets

METHOD AND APPARATUS FOR BASE STATION AND MOBILE STATION TIME CALIBRATION

RELATED APPLICATIONS

This application claims priority to U.S. Provisional Application No. 60/223,459, filed Aug. 7, 2000.

BACKGROUND OF THE INVENTION

I. Field of the Invention

The current invention relates to communications. More particularly, the present invention relates to a method and apparatus for calibrating the time delays in Base Stations and Mobile Stations.

II. Description of the Related Art

A modern communications system is required to support a variety of applications. One such communications system is a code division multiple access (CDMA) system that conforms to the "TIA/EIA/IS-95 Mobile Station-Base Station Compatibility Standard for Dual-Mode Wide-Band Spread Spectrum Cellular System," (commonly referred to as the "IS-95 standard"). In addition, a publication of the Telecommunications Industry Association entitled "The cdma2000 ITU-R RTT Candidate Submission," which is being developed as TIA/EIA/IS-2000, provides specifications for transmitting data traffic and voice traffic over the forward and reverse links. One method that conforms to this standard for transmitting data traffic in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the data traffic or voice data is partitioned into code channel frames that are 20 milliseconds wide with data rates as high as 8×14.4 kbps.

The CDMA system supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFOR-Mobile Station IN A CDMA CELLULAR TELEPHONE SYSTEM," both assigned to the assignee of the present invention and incorporated herein by reference.

In a CDMA system, communications between users are conducted through one or more Base Stations. In wireless communication systems, forward link refers to the channel through which signals travel from a Base Station to a Mobile Station, and reverse link refers to channel through which signals travel from a Mobile Station to a Base Station. By transmitting data on a reverse link to a Base Station, a first user on one Mobile Station may communicate with a second user on a second Mobile Station. The Base Station receives the data from the first Mobile Station and routes the data to a Base Station serving the second Mobile Station. The first Mobile Station and the second Mobile Station may either be served by a single Base Station or multiple Base Stations, depending upon their location. In any case, the Base Station serving a Mobile Station sends the data to that Mobile Station on the forward link. Instead of communicating with a second user on a Mobile Station, a first Mobile Station may also communicate with a second user on a wireline telephone. The second user is connected to the wireless communication system through a public switched telephone network (PSTN), or a terrestrial Internet through a connection with a serving Base Station.

Up until now, CDMA Base Stations as well as CDMA Mobile Stations have been time calibrated for the sole purpose of providing communication services. With the introduction of position location capabilities, both CDMA Base Stations and Mobile Stations need to be time calibrated for both position location purposes and communications purposes. For communications purposes, accuracy on the order of one CDMA chip (1/1.2288 MHz) is sufficient for proper operation of both the Mobile Stations and the Base Stations. However, for position location purposes, an uncompensated error of one chip corresponds to approximately 300 meters of ranging error.

In communications systems having position location capabilities in which ranging information is derived from both GPS (global positioning system) satellites and Base Stations, timing measurements are made from signals transmitted by both GPS satellites and Base Stations in order to calculate the location of the Mobile Station. GPS signals are broadcast from earth orbiting satellites to earth bound receivers. However, no signals are transmitted from the earth bound receivers back to the GPS satellites. In such systems, GPS receivers calculate their position using pseudo ranges information from satellite-to-earth link only. However, a terrestrial CDMA system is by design a bi-directional communication system with both forward and reverse links. In addition to forward link measurements similar to those used in a GPS system, a measure of Round-Trip-Delay (commonly referred to as "RTD") is available from a CDMA communication system. RTD is a measurement of the time it takes a CDMA signal to travel from the antenna of a Base Station to a Mobile Station and back to an antenna of the same Base Station. RTD is useful for a positioning system. RTD is calculated in the Base Station for each Mobile Station with which the Base Station is actively communicating.

A CDMA communications system having position location capabilities can be deployed with varying degrees of infra-structure modifications and system performance. One such system would use GPS timing measurements and forward link timing measurements from the terrestrial system, but not RTD. The advantage of this implementation is that Base Station software modifications required to obtain RTD are unnecessary. The disadvantage is a reduction in the availability and accuracy of position location determinations made under adverse GPS and CDMA conditions.

However, regardless of whether the position location capability uses RTD or not, calibration of the Base Station and the Mobile Station is essential to accurate position location determinations.

Therefore, a need currently exists for a method and apparatus for calibrating Base Stations and Mobile Stations in order to allow accurate position location determinations to be made.

SUMMARY OF THE INVENTION

The present invention is directed to methods and apparatuses for calibrating Base Stations and Mobile stations within communication systems that have position location capabilities.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

GPS Position Determination Overview

Geometrically, the position of a GPS (global positioning system) receiver can be calculated by calculating the distance between the receiver and the known positions of three GPS satellites. The signals transmitted by GPS satellites are BPSK spread-spectrum signals modulated on a 1.5745 GHz carrier with a unique PRN (pseudorandom noise) sequence for every satellite. The period of a GPS PRN sequence is exactly 1 ms. Typically, the propagation delay of the RF signal from the satellite to an earth bound receiver is on the order of 70 ms. To simplify things, it can be assumed that the GPS receiver already "knows" the integer number of milliseconds that have elapsed between the time the signal is transmitted and the time the signal is received. Accordingly, only the fractional part of the last GPS PRN received need be measured to determine the amount of time the signal took in traveling from the satellite to the receiver. The receiver measures the fractional portion of the last GPS PRN by determining the difference between the time at which the PRN from the satellite rolls over and the time at which the received signal rolls over. By knowing this difference, the propagation time is determined. Using the speed of light, the distance to the satellite can be approximated. Further details regarding how GPS signals are measured are well know in the art and are not included here for the sake of brevity.

The above discussion assumes that the GPS system clock and the receiver clock are perfectly aligned. That is, the time at which the GPS PRN rolls over is known, but must be determined at the Mobile Station by using the clock in the Mobile Station. If the clock in the Mobile Station is not in perfect alignment with the clock in the satellite that sent the signal, then the Mobile Station cannot accurately determine when the roll over will occur at the satellite.

If we assume that the local clock is offset in time by tfm, then to calculate a three dimensional position, a GPS receiver has to solve for x, y, z and tfm. Fortunately, tfm is common and equal for all of the satellite measurements. For this reason, a GPS receiver needs to measure the timing of an additional satellite signal to resolve for the four unknowns, x, y, z and tfm. Hence a GPS receiver needs to detect signals from at least four satellites to accurately compute its position.

It also must be assumed that RF delays (such as the delays encountered in the components of the receiver, such as filters etc.) and antenna cable length are all known (i.e., all perfectly calibrated) so that their effect on the measured time can be removed from the measurement. This is necessary since the delay measurement is assumed to be from the transmission antenna of the Base Station to the antenna of the Mobile Station. This measurement should not include any time delays encountered between the antenna of the Base Station and the Base Station transmitter. However, this assumption is usually not true. Practically, the error tfm includes RF delays, antenna cable delays, as well as the receiver time offset. Since the receiver has no way of distinguishing between these components, a GPS receiver always calculates the position of the GPS antenna. From the above we see that any tfm can be calculated by including one additional measurement as long as all RF signals that were used in the position calculation experience the same tfm.

CDMA Position Determination Overview Without RTD

Base Station Calibration Requirement

In the case of CDMA without RTD, CDMA Base Stations are treated the same as GPS satellites. In the GPS discussion above it was noted that in order to determine the location of the GPS receiver the distance to three GPS satellites must be known. In addition, the exact position of these satellites at the time the measurement was taken must also be known. In order to determine the distance to three satellites accurately, timing measurements must be made on signals received from four satellites. One additional satellite is required to account for differences in the alignment of the clock in the satellite and the clock in the Mobile Station that receives the signals from the satellite.

In accordance with one method and apparatus, the position of the satellites is provided by a GPS receiver located at a PDE (position determining equipment). It should be noted that PDEs are commonly known devices within a CDMA communication system with position location capability. Since the Base Station antenna locations are fixed, the position of the Base Station antenna can be accurately surveyed and stored in the PDE. In addition, the time at which the PRN roll leaves the satellite antenna is very accurately know with respect to the GPS global time clock 1PPS tick. The CDMA Base Stations are to be used for position location in a manner similar to that of the GPS satellites. Therefore, the time at which the PN (pseudorandom) code rolls on the pilot at a Base Station antenna must be accurately known for each Base Station with respect to the GPS global time clock 1PPS tick. Knowing the relationship between the PN roll over of the pilot at the Base Station antenna allows the GPS signals and the CDMA pilots to be synchronized to the same time reference (i.e., the GPS global time clock). Such synchronization minimizes the total number of GPS satellites and Base Stations needed to calculate a position fix.

In summary, for communications systems that have position location capability without the use of RTD, the physical location of the Base Station antenna must be accurately surveyed and the timing of the pilot PN code roll (adjusted for PN code offset with respect to a timing reference signal, such as the GPS 1PPS) must be accurately measured.

In contrast to the above, the Base Stations can be calibrated with respect to a common time reference or timing reference signal. That time reference or timing reference signal could be unrelated to the global GPS 1PPS. This would force the system into an asynchronous mode of operation. However, it is preferable to choose the GPS global 1PPS as the time reference, since it is the most convenient and leads to higher availability by allowing operation in synchronous mode.

Mobile Station Calibration Requirement

In the above disclosure, it was assumed that the time of arrival of a GPS signal is measured according to the receiver's internal time clock. That clock was assumed to be offset from the GPS global time clock. When using CDMA pilots for ranging, the RF delay and antenna cable delay for CDMA signal received at the Mobile Station are generally different than the delays encountered by the GPS signal traversing the same cable and components. This gives rise to two possible modes of operation. The first mode, called the synchronous mode, assumes that this difference between the delay encountered by the GPS signal and the CDMA signal been calibrated and so is known to the Mobile Station. The second mode, called the asynchronous mode, assumes that this delay difference is unknown and is an arbitrary quantity within an estimated limit.

Synchronous Mode

In synchronous mode, the difference between the propagation delay encountered by a GPS signal from the antenna to Mobile Station's internal time clock and that encountered by a CDMA from the antenna to Mobile Station's internal time clock is preferably measured and stored in the Mobile Station during manufacture. Once this difference in delay is known, measurements of the times of arrival for both GPS and CDMA signals can be made with respect to the same common time reference. Please note that the relation between this common time reference and the GPS global 1 PPS could be arbitrary. What is important is that both GPS and CDMA measurements are referenced to one common time reference. This is enough to allow synchronous operation.

In synchronous mode, CDMA pilots become equivalent to GPS satellite signals. Therefore, a position fix is possible given measurements from any combination of four GPS satellites and CDMA Base Stations. For example, a position fix in synchronous mode is possible given 2 GPS satellites and two CDMA pilots.

Asynchronous Mode

In asynchronous mode, the delay difference in the Mobile Station encountered by GPS and CDMA signals is not known. In the above disclosure, Mobile Station clock offset, RF delays and antenna cable delays were combined in the variable tfm. In asynchronous mode, the combination of these delays encountered by the CDMA signals differs by an unknown amount from that encountered by the GPS signals. Therefore, the term tfmc is defined to represent the combination of these delays encountered by CDMA signals. It should be understood that for asynchronous mode, tfmc is different from, and unrelated to, tfm (the delay for GPS). Therefore in asynchronous mode, the system is attempting to solve for x,y,z,tfm and tfmc. For this reason, under asynchronous mode operation, one additional CDMA or GPS measurement is required in order to solve for the extra independent variable.

To summarize, in asynchronous mode, a Mobile Station needs to make measurements from a combination of five GPS satellites or CDMA Base Stations in order to compute a position. Just as was the case in synchronous mode, the makeup ratio of how many measurements came from CDMA versus GPS is inconsequential.

As we mentioned above, systems that do not use RTD do not need to know the absolute value of tfm or tfmc prior to calculating the position. However, the more accurately tfm is known, the faster the Mobile Station will be able to acquire satellites. This is because the timing of the Mobile Station (which is offset by tfm) is used to align the GPS search window provided to the Mobile Station by the PDE and used to initially search for satellites. The uncertainty in tfm directly increases the GPS search window. A value for tfm of several hundred microseconds is typical in CDMA Mobile Stations.

CDMA Position Determination Overview with RTD

In a CDMA system, a well known component of the Base Station is an application specific integrated circuit (ASIC) commonly referred to as the Cell Site Modem (CSM). The CSM continually calculates RTD for the Mobile Stations with which the Base Station is communicating. Even though this information is available at the Base Station, this information generally does not get reported to the other devices in the system. Fortunately, for most CDMA systems, only software modifications are required in order to make the RTD available to the PDE to be used for calculating the position of a Mobile Station. This section assumes that RTD is available to the PDE for every Mobile Station attempting calculate a position fix with the assistance of that PDE.

Components of RTD

RTD is a measurement in the CSM of the length of time it takes a CDMA signal to leave the CSM and reach the Mobile Station and return to that same CSM. An ideal RTD would have two properties. The first is that ideally the forward link and the reverse link components are equal (i.e. RTD is symmetrical). The second it that the RTD only contains the time from Base Station antenna to Mobile Station antenna plus the time from the Mobile Station antenna to the Base Station antenna with all RF and cable delays taken out. Unfortunately RTD is not always symmetrical. Furthermore, reported RTD includes cable delays that should be calibrated out. For simplicity, it is assumed that the Base Station antenna and the Mobile Station antenna are co-located. It should be understood that this assumption is made valid by knowing the distance between the Base Station and the Mobile Station and subtracting the amount of time required for the signals to propagate between the two. Therefore, the contribution to RTD due to signal propagation in the air will be assumed to be zero and RTD only contains delays in the Base Station and delays in the Mobile Station. In addition, it is assumed that RTD only contains the fractional part of a 80 ms frame. The true RTD would include an integer number of 80 ms frame delays. This discussion assumes that integer 80 ms frame delays have been taken out of the reported RTD.

RTD is broken into a number of subparts. The boundaries at which the RTD into is broken into these different subparts could be arbitrary as long as the sum of all the subparts equal the measured RTD. In accordance with one embodiment, the RTD is broken into Base Station components and Mobile Station components. The Base Station component is further divided into a forward link component, tfb, and reverse link component, trb. Similarly on the Mobile Station component is broken into a forward link component, tfm, and a reverse link component, trm. By definition $RTD = tfb + tfm + trm + trb$ Mobile Station delay $= tfm + trm$, Base Station delay $= tfb + trb$ As mentioned before, the boundary separating RTD into its subparts could be arbitrarily chosen as long as the sum of the subparts equals the RTD. In one embodiment of the disclosed method and apparatus, at the Base Station, the global GPS 1PPS is selected as the boundary separating Base Station delay into tfb and trb. At the Mobile Station, the Mobile Station master finger timing is selected as the boundary separating the Mobile Station delay into tfm and trm.

Using the above definitions, for systems that use RTD, the values of tfb, tfm, trm and trb must be known. In contrast, we note that for systems that do not use RTD, only tfb need be known to calibrate the Mobile Station and Base Station. On the Mobile Station side, the difference between tfm for GPS signals and tfm for CDMA signals, tfmc must be known. For systems that do not use RTD the absolute value of tfm or tfmc do not need to be known. Only the difference between tfm and tfmc in the Mobile Station are required. It should be noted that limiting the uncertainty of tfm reduces the GPS search window. However, tfm does not need to be tightly calibrated better than a few microseconds accuracy for that purpose.

Uses of RTD

RTD is used for two purposes. The first is for Mobile Station timing. The second is for Mobile Station ranging.

Use of RTD for Mobile Station Timing

While the assumption made above is that RTD does not include the air propagation time for the forward and reverse links, that assumption is suspended for the following. Assuming that the forward and reverse links are symmetrical, the time offset between a timing reference signal (such as the global GPS 1PPS) and the Mobile Station timing can be measured. A calculation of the air propagation time is made by removing the RF and cable delays from RTD and dividing what remains by 2. This results in the one-way delay, tair. The time offset between the Mobile Station time reference and the Base Station 1PPS would then be:

Mobile Clock offset=$tair+tfb+tfm$

The above calculation assumes that the forward and reverse links are symmetrical with equal air delays. Fortunately, the use of RTD for timing is immune to multipath so long as the links are symmetrical.

By transferring GPS time accurately to the Mobile Station, we are able to narrow the GPS search window. This leads to faster time to first fix (satellite acquisition time). However, with searchers that have very fast search times, the usefulness of accurate RTD for this purpose is relatively low.

Use of RTD for Ranging

The real advantage of RTD is when it is used for ranging. By using the method above we are able to calculate the free air one way delay. This can be used as a distance from a Base Station to the Mobile Station and is used in the PDE in the position calculation. Range measurement based on RTD lead to better DOP than when RTD is not used. This is because RTD directly measures the Mobile Station's clock offset. As such it is usually geometrically orthogonal to the possible solution curves from GPS and CDMA forward link measurements only. With a range calculated from RTD, one less measurement is needed to determine the Mobile Station's position. Because RTD delivers the time offset, the range from an RTD measurement generally leads to better Dilution of Precision (DOP) for the position determination.

Calibration Procedures for Systems That Do Not Use RTD

Base Station Calibration

When deployed without RTD, the Base Station calibration requirements have two parts. The first part is to determine the physical location of the Base Station antenna. The second part is to measure tfb as defined in the previous section.

Determining Base Station Antenna Location

It is recommended that the physical location of the antenna be determined by conventional methods. Typically in a CDMA Base Station, every sector contains one transmit antenna and two receive antennas for receive diversity. For systems without RTD, only the location of the transmitting antenna is important.

Naturally, when RTD is included, both the locations of the transmitting and the receive antennas become important. Fortunately, the distance between transmit and receive antennas in one sector is typically 1–2 meters. In addition, the transmitting antenna is usually located in the middle between the two receive antennas. Therefore, it should be acceptable to report the transmitting antenna location as the effective antenna location used in the PDE, even when RTD is used.

Determining tfb

Recall that tfb is the time offset of the zero PN offset roll at the antenna when measured with respect to a timing reference signal (such as the global GPS 1 PPS). We can determine tfb of a Base Station using any one of three methods.

Figure 1:
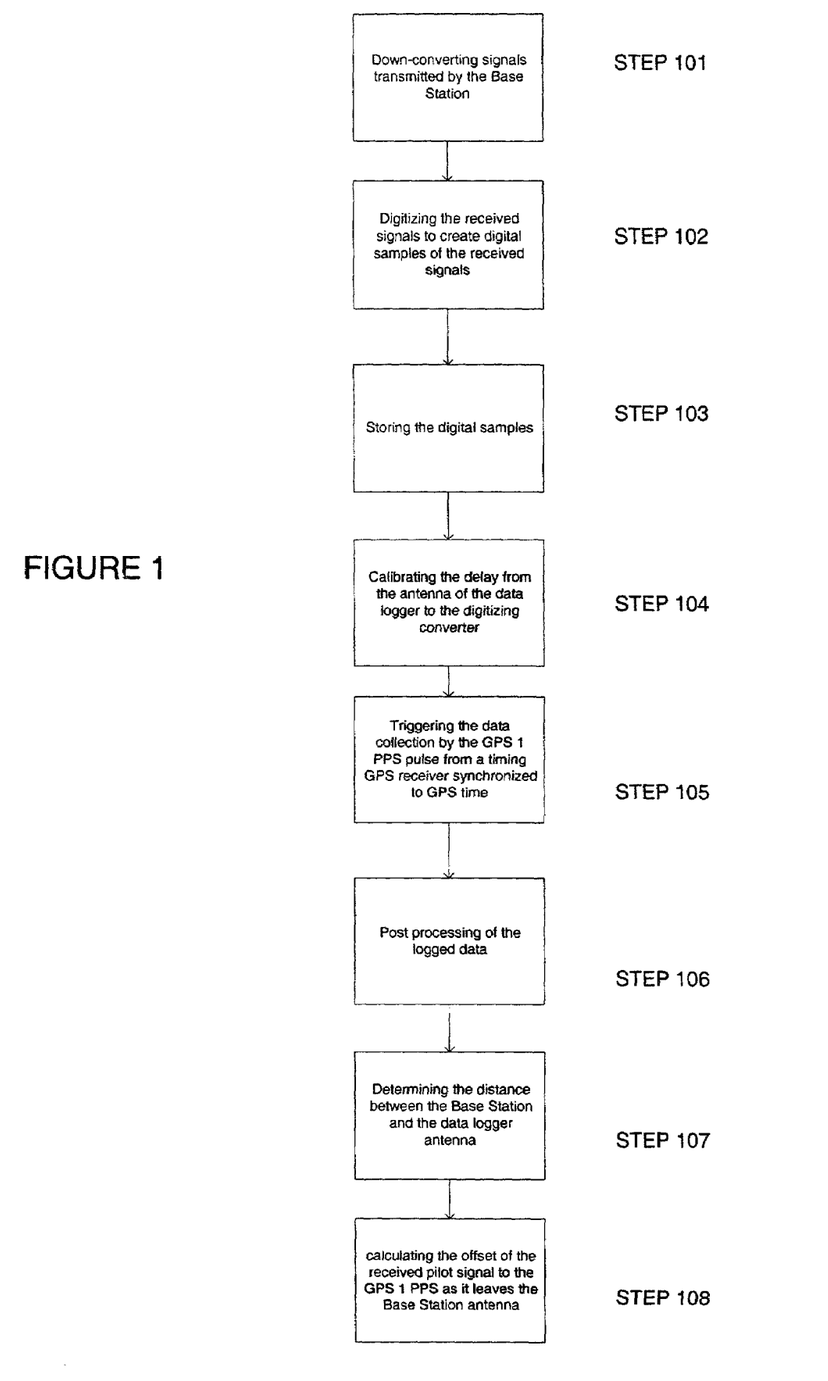
FIG. 1 is a flow chart of a first method for determining the time offset of the zero PN offset roll at the antenna when measured with respect to the global GPS 1 PPS.
Figure 2:
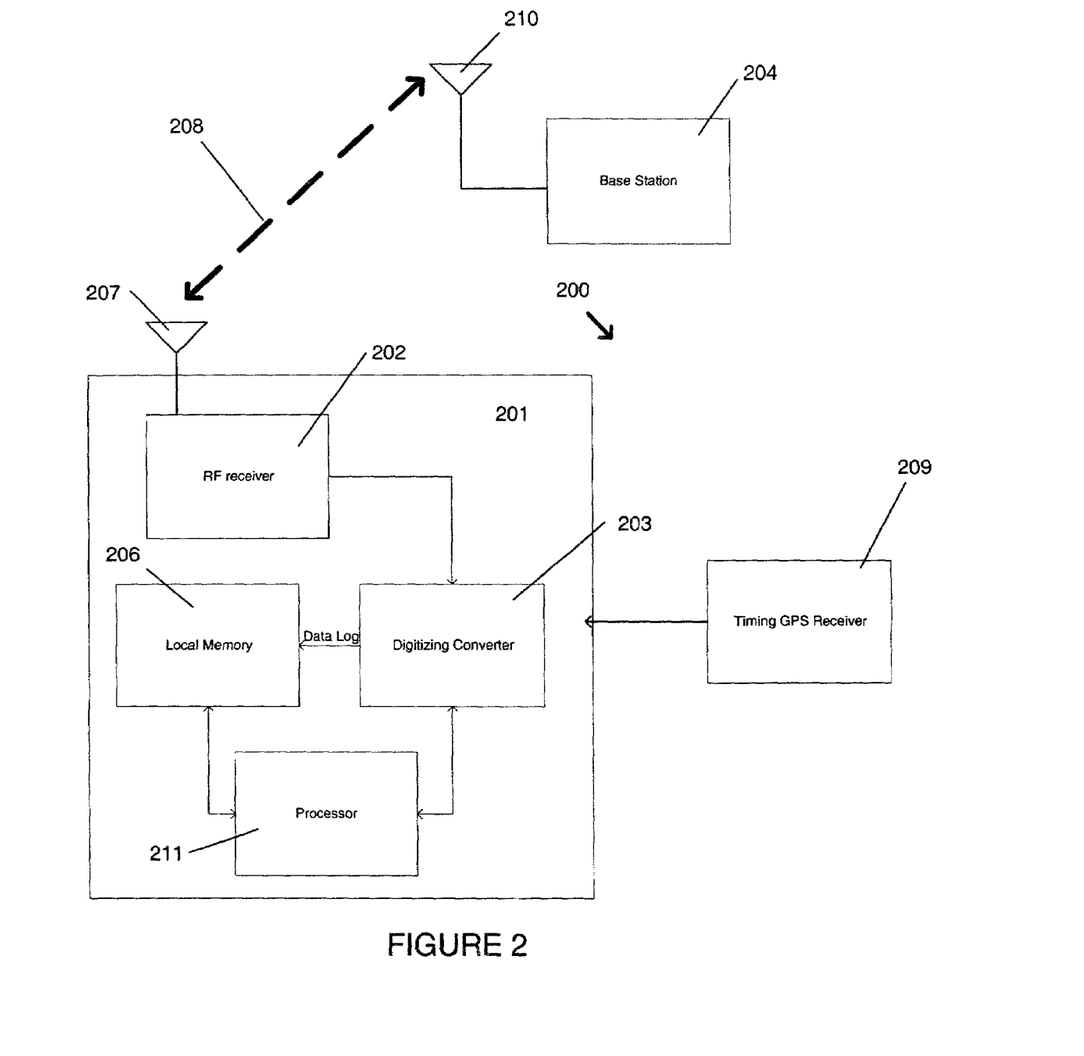
FIG. 2 is a simplified block diagram of the apparatus used to implement the first method

FIG. 1 is a flow chart of the first method. FIG. 2 is a simplified block diagram of the apparatus 200 used to implement the first method. The first method uses a "data logger" 201. The data logger 201 includes an antenna 207. The data logger 201 has an RF receiver 202 tuned to a Base Station carrier. The RF receiver 201 down-converts signals transmitted by the Base Station 204 (STEP 101). The data logger 201 also has a digitizing converter 203. The digitizing converter 203 digitizes the received signals to create digital samples of the received signals (STEP 102). The data logger 201 then stores the digital samples in a local memory 206 (STEP 103). The delay from the antenna 207 of the data logger 201 to the digitizing converter 203 (referred to as the antenna/converter delay) is calibrated (STEP 104). Calibrating the delay can be performed by any signal measurement equipment capable of measuring the propagation delay of signals between the antenna 207 and the digitizing converter 203, as is well known in the art. The data logger 201 is placed so that a line-of-sight path 208 (represented by a broken line in FIG. 1) exists between a Base Station antenna 210 coupled to the base station 204 and the data logger antenna 207. The data collection within the data logger 201 is triggered by the GPS 1 PPS pulse from a timing GPS receiver 209 synchronized to GPS time (STEP 105). Post processing of the logged data reveals the relationship between the beginning of the logged data and the GPS 1 PPS pulse (STEP 106). The post processing may be done in a processor 211 in the data logger 201 (as shown in FIG. 1) or in a processor that is located at a remote location with respect to the data logger 201. The distance between the Base Station 204 and the data logger antenna 207 is determined using any one of a variety of offset surveying methods, such as inclinometers and Laser distance sites (STEP 107). From this, the offset of the received pilot signal to the GPS 1 PPS as it leaves the Base Station antenna 210 can be calculated (STEP 108).

Figure 3:
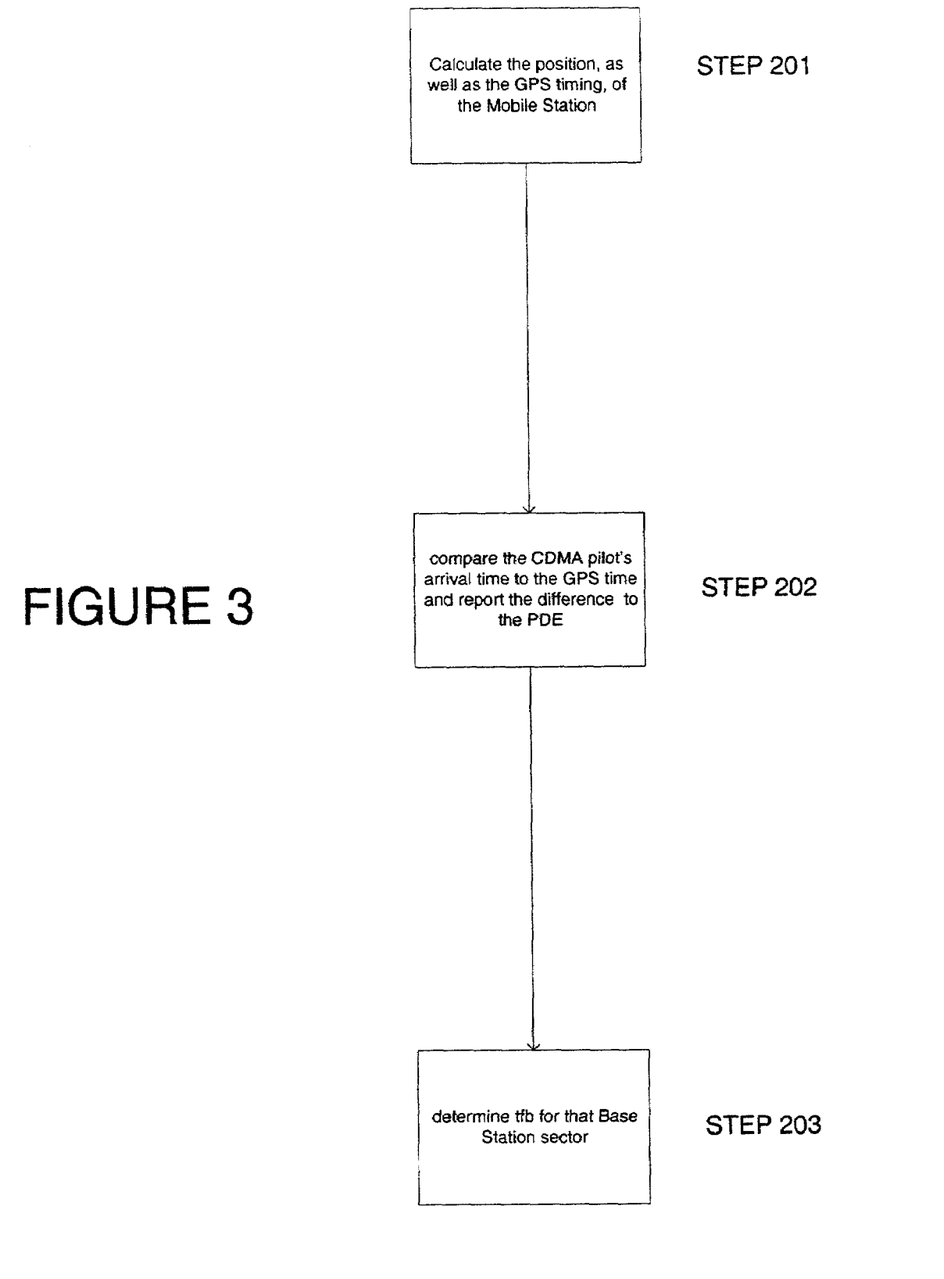
FIG. 3 is a flow chart of a second method for determining the time offset of the zero PN offset roll at the antenna when measured with respect to the global GPS 1 PPS.
Figure 4:
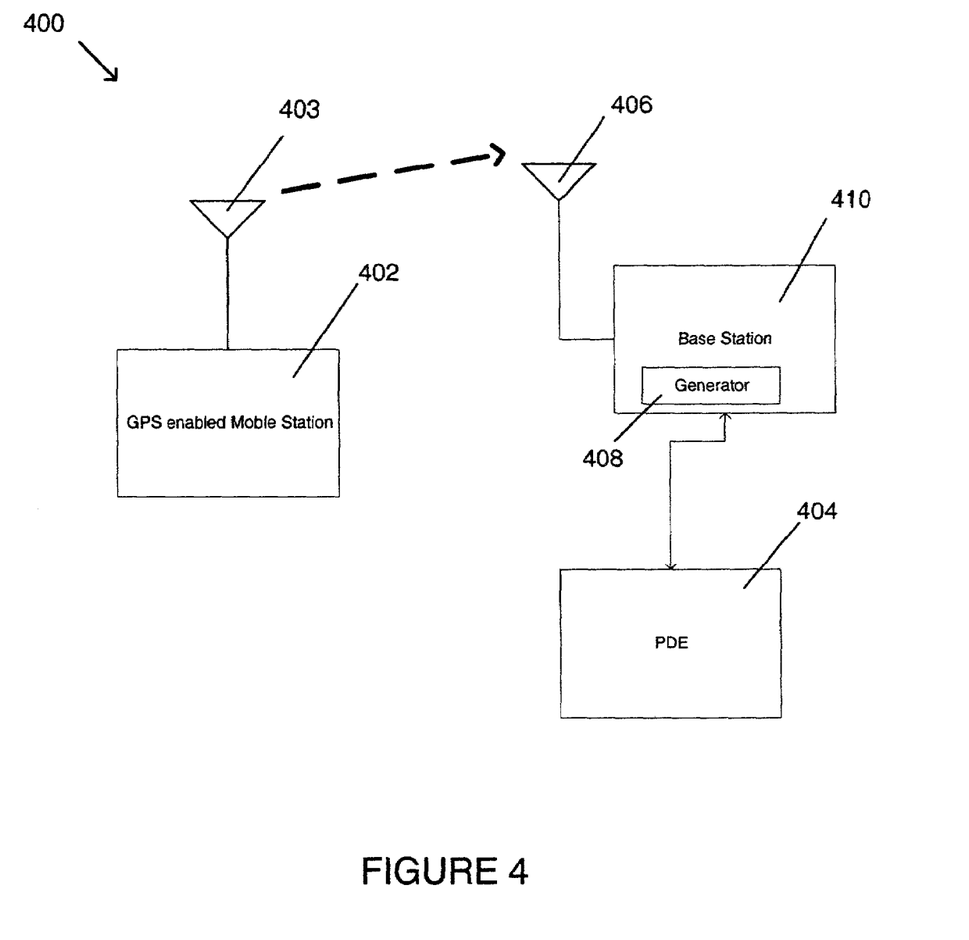
FIG. 4 is a simplified block diagram of the apparatus used to implement the second method.

FIG. 3 is a flowchart of the second method. FIG. 4 is a simplified block diagram of the apparatus 400 used to implement the second method. The second method uses a GPS enabled Mobile Station 402. In cases in which there are enough GPS satellites visible to a Mobile Station antenna 403 coupled to the Mobile Station 402, the Mobile Station 402 can calculate the position, as well as the GPS timing, of the Mobile Station 402 (STEP 201). Once the position of the Mobile Station 402 is known, the Mobile Station 402 compares the CDMA pilot's arrival time to the GPS time and reports the difference to a PDE 404 (STEP 202). By knowing (1) the surveyed position of a Base Station antenna 406, (2) the accurate location of the Mobile Station 402, (3) the offset of the Base Station pilot signal as received at the Mobile Station 402, and (4) the offset of the Base Station pilot at the Base Station pilot generator 408 within a Base Station 410, the PDE 404 is able to determine tfb for that Base Station 410 (STEP 203). This method is useful since it can continually be used during normal operation of the communication system. This method assumes that the system is already operational and some coarse calibration of Base Station 410 has been done. It also assumes that there is a location where both unobstructed view by the Mobile Station 402 of the Base Station antenna 406 and the open sky for enough satellites to be available.

Figure 5:
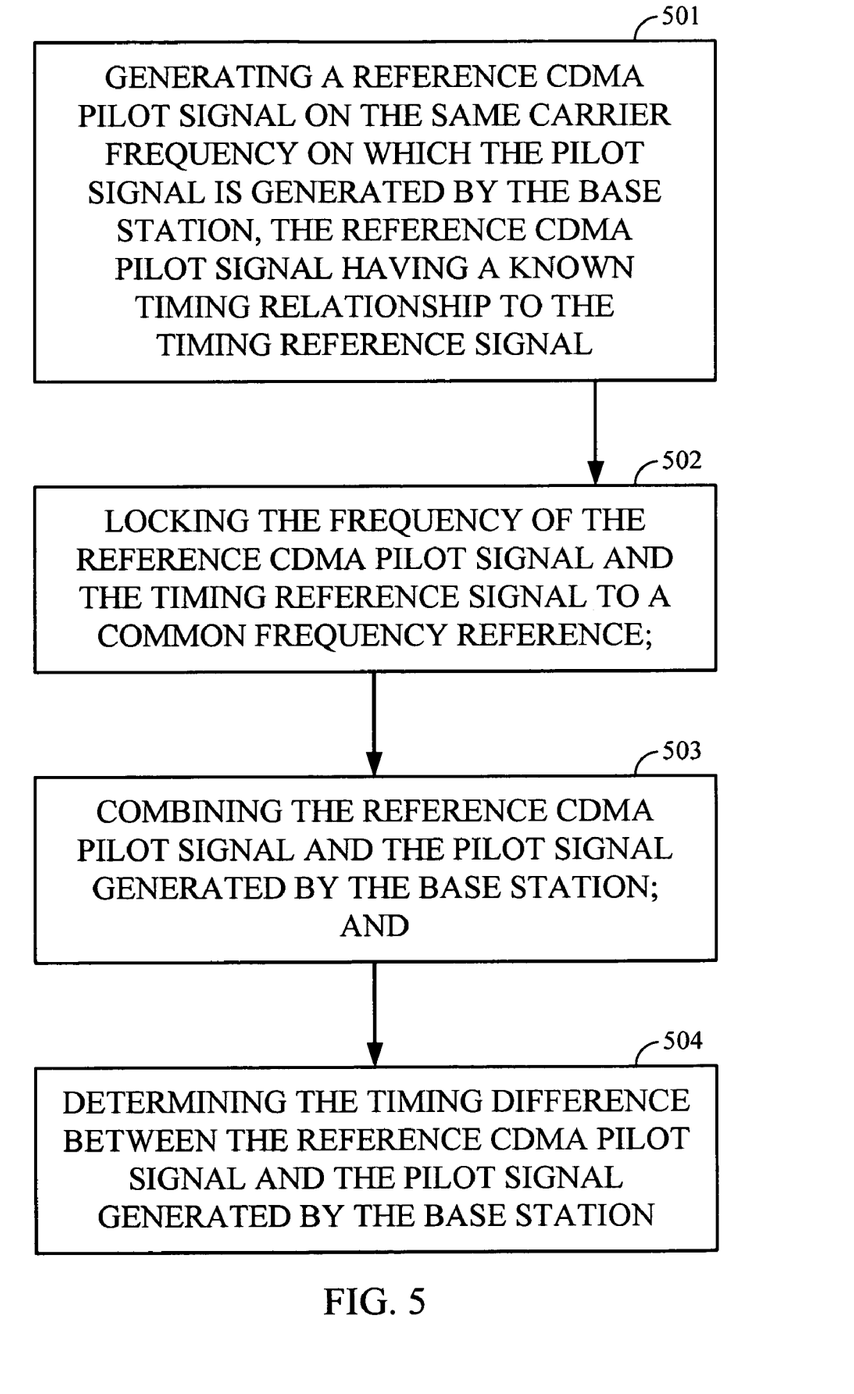
FIG. 5 is a flow chart of a third method for determining the time offset of the zero PN offset roll at the antenna when measured with respect to the global GPS 1 PPS.
Figure 6:
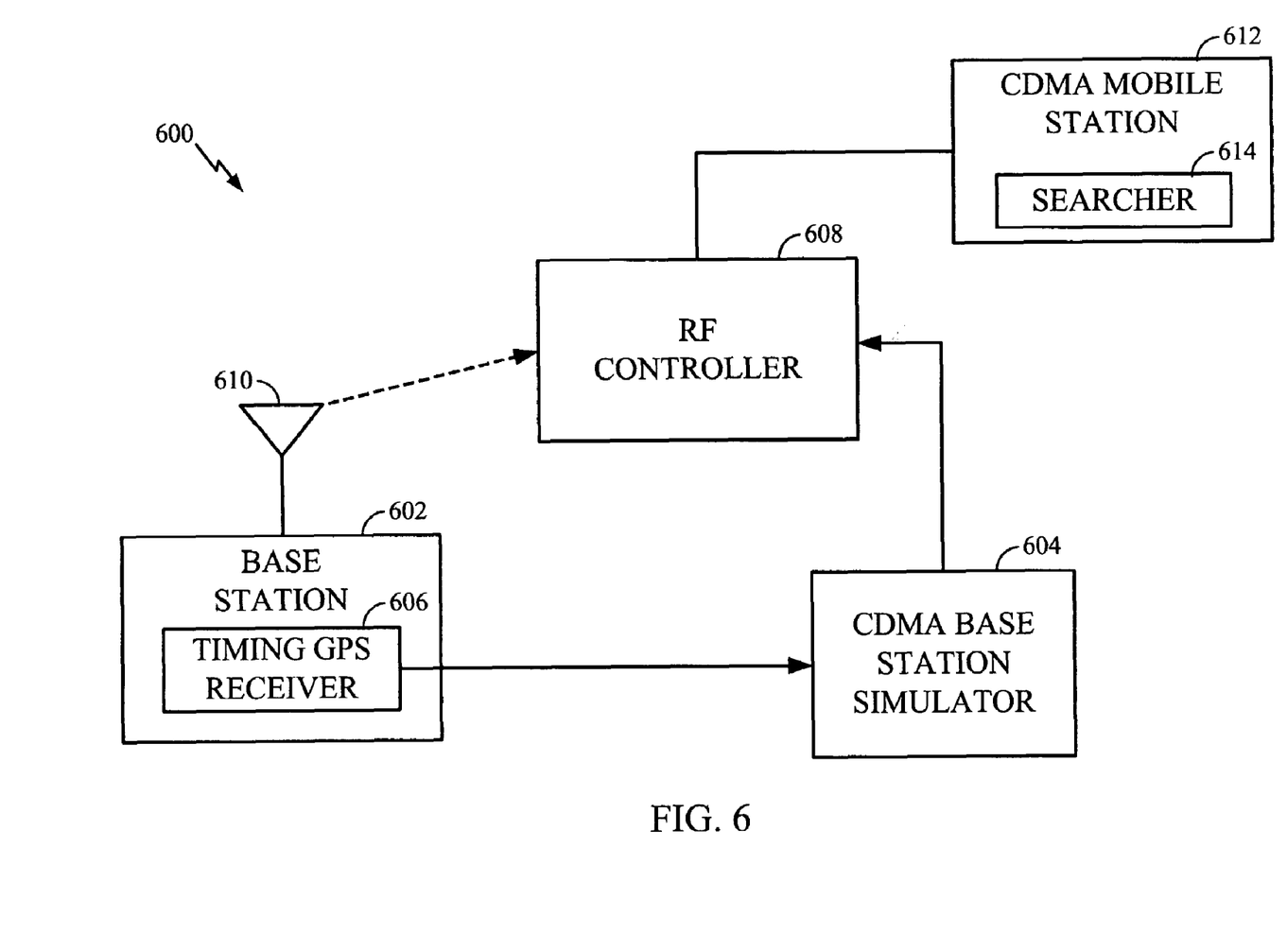
FIG. 6 is a simplified block diagram of the apparatus used to implement the third method.

FIG. 5 is a flow chart of the third method. FIG. 6 is a simplified block diagram of the apparatus 600 used to implement the third method. The third method relies on generating a reference CDMA pilot on the same RF carrier frequency as the pilot being transmitted by a Base Station 602 (STEP 501). The reference CDMA pilot has a known and calibrated relationship to a timing reference signal, such as the global GPS 1 PPS. One method for generating such a CDMA reference pilot is to use a CDMA Base Station simulator 604, such as a CMD80 from Tektronix. These Base Station simulators 604 generate a CDMA pilot at any desired frequency. Such simulators 604 also have provisions to output the "Even Second" tick of the CDMA system timing (i.e., indications at two second intervals calibrated to occur on a GPS 1 PPS occurrence). Since the synchronization frame and traffic frames in CDMA fit within 80ms, the 1 second tick and the CDMA frames line up every 2 seconds. Hence a zero PN offset pilot and an even second should line up coming out of the Base Station simulator 604.

At the Base Station 602, we use a timing GPS receiver 606, such as a Trimble Thunderbolt, to generate the GPS 1 PPS. Furthermore, we lock the Base Station simulator 604 to the GPS frequency reference by using the 10 MHz output of the timing GPS receiver 606 (STEP 502). This eliminates drift between the 1 PPS from the timing GPS receiver 606 and the Even Second from the Base Station simulator 604 relative to one another. The time offset between the Even Second from the Base Station simulator 604 and the 1 PPS from the timing GPS receiver 606 is then measured.

Having done that we now know the time offset between the pilot generated by the Base Station simulator 604 and the GPS 1 PPS. An RE combiner 608 is used to RF combine the pilot generated by the Base Station simulator 604 with the signal coming out of the Base Station antenna 610 and pipe it into a device capable of determining the relative timing between the combined signals (STEP 503). One such device is a conventional CDMA Mobile Station 612. A searcher 614 in the Mobile Station 612 determines and reports the time offset between the two pilots (STEP 504). By knowing this offset and the offset between the Even Second tick in the Base Station simulator 604 and the GPS 1 PPS we are able to determine the time offset of the Pilot PN roll at the Base Station antenna 610 as it relates to the GPS 1 PPS.

If the above procedure is performed at the Base Station controller, there are two sources of error. The first source of error comes from the need for a GPS RF feed. Fortunately every CDMA Base Station has a GPS receiver and therefore has GPS RF signal available. Interruption of this RF path for purposes of calibration does not affect the Base Station function because of the accurate free wheeling ability of its own GPS receiver during GPS signal outages. However, the length of the RF cable to the GPS antenna in clear view of the sky must be calibrated out since it introduces time offset into the measurements.

The second source of error is the length of the CDMA antenna cable from the Base Station controller to the antenna itself. This delay must be calibrated out as well. Both GPS and CDMA antenna cables could be measured by use of time-domain reflectometers.

Mobile Station Calibration

As mentioned above two items need calibration on the Mobile Station side for systems that do not use RTD. Fortunately, only one of these items need to be tightly calibrated, (tfm−tfmc). The other item need only to be estimated loosely, tfm.

Determining the Difference Between tfm and tfmc

We can calibrate the difference between tfm and tfmc using two methods. The first method is to build a device that takes two digital streams of base band data. The first stream contains a base band representation of a CDMA pilot while the second contains base band representation of a GPS satellite. The data streams are aligned such the time relationship of the PN rolls of the CDMA stream and the GPS streams is known. The streams are converted to analog and upconverted to CDMA and GPS frequencies using similar RF hardware with equal delays. The two signals are then combined and fed to the Mobile Station under calibration. Using this signal as a reference, the Mobile Station is able to calibrate the time difference between tfm and tfmc.

The second method uses a CDMA Base Station simulator and a single channel GPS simulator, e.g. STR4775 from Global Simulation Systems (GSS). In addition to GPS RF, the GPS simulator outputs a pulse that is lines up with the GPS PN roll. By measuring the time offset between this pulse from the GPS channel simulator and the Even Second pulse from a CDMA Base Station simulator the time offset between the CDMA and GPS PN rolls embedded in the RF signals can be calibrated. The two RF signals are then combined and feed to the Mobile Station under calibration. Having calibrated the offset of the incoming CDMA and GPS signals relative to each other this Mobile Station is now able to use the incoming CDMA signal as a reference signal to calibrate out the difference between tfm and tfmc.

It should be noted that if the Base Station simulator can align Even Second internal timing to an externally generated 1PPS (from a GPS simulator), then the step of calibrating the offset of the two RF signals could be eliminated.

Calibrating tfm

Typically in a Mobile Station, tfm is on the order of several hundred microseconds. This delay must be accounted for so that the GPS search window could be efficiently centered. Given a 256× searcher, and knowing that tfm is only needed to efficiently center the search window and is not used for timing, tfm need only be determined to a an accuracy of 1 to 3 microseconds. Previously, the phone internal master finger timing was selected to be the time reference delineating tfm from trm. In a Mobile Station, this internal timing could be made externally available. Using a single channel GPS simulator with 1 PPS output, the time offset of a SYNC80M pulse out of the Mobile Station under calibration relative to the 1 PPS from the single channel GPS simulator can be measured. A Mobile Station can determine the time alignment between a detected GPS peak in the searcher and SYNC80M. From this information, tfm could be determined.

Alternatively, having determined (tfm−tfmc), a CDMA simulator can be used with an 80 ms tick. By measuring the time offset between the SYNC80M and the 80 ms sync frame timing of the simulator we are able to directly measure tfmc. Knowing (tfm−tfmc) we can find tfm. Note that when not employing RTD, the calibration of tfm is sufficiently coarse that it could be done during design time. Therefore, there is no reason to route the SYNC80M signal externally on a production Mobile Station since this calibration number would be determined at a pre-production stage.

Systems That Use RTD

If RTD is used, then tfm, trm and trb are all preferably known accurately in addition to the methods for calibrating a system without RTD. Using the methods disclosed above, tfm can be calibrated more accuracy than when RTD is not used. Calibrating tfm more accurately yields an accurate tfm. Currently, the majority of Base Station simulators allow for calibrating transmit time=(tfm+trm). By increasing the accuracy of these simulators with regard to measuring the transmit time trm can be calibrated. At this time, tfb, tfm and trm are each accurately known. In a system that uses RTD, the Base Station reports RTD to the PDE. By having a line-of-sight between a Mobile Station and a Base Station with a known distance between the Base Station and Mobile Station, with tfb, tfm, trm all accurately known, and by subtracting free air delays trb can be measured.

For the above disclosure, it can be seen that adding RTD capability requires (1) increases tfm calibration accuracy, (2) measuring the transmit time on the Mobile Station and thus calibrating trm using available Base Station simulators and (3) determining trb given a Mobile Station with determined tfm and trm. Note that adding trb calibration to a sector does not require visiting the Base Station controller location. This additional calibration for RTD inclusive operation can be done external to the Base Station.

The disclosed methods and apparatuses provided above enable any person skilled in the art to make or use the invention recited in the following claims. However, various modifications to the disclosed method and apparatus will be readily apparent to those skilled in the art, and the principles disclosed may be applied to other methods and apparatuses without the need to invent. Accordingly, the claimed invention is not intended to be limited to the methods and apparatuses shown herein. Rather, the claimed invention is to be accorded the widest scope consistent with the principles and features disclosed above.

What is claimed is:

1. A method for determining an amount of delay between a base station and a transmission antenna of the base station, comprising:
   determining locations of a reception antenna and the transmission antenna to determine an air time between the reception and transmission antennas;
   determining a transmission time by calculating a time it takes for a signal transmitted from the base station through the transmission antenna to arrive at the reception antenna; and
   determining the amount of delay between the base station and the transmission antenna by subtracting the air time from the transmission time; and
   offsetting a relative timing of the signal transmitted from the base station with respect to a reference signal at a point of generation of the signal transmitted from the base station to determine a timing at the transmission antenna of the signal transmitted from the base station with respect to the reference signal.

2. The method of claim 1, wherein the location of the reception antenna is determined by using a GPS position location system.

3. The method of claim 1 wherein offsetting a relative timing of the signal transmitted from the base station with respect to a reference signal comprises:
   determining the relative timing of a pilot signal transmitted by the base station with respect to a timing reference signal, comprising:
   generating a reference CDMA pilot signal on the same carrier frequency on which the pilot signal is generated by the base station, the reference CDMA pilot signal having a known timing relationship to the timing reference signal;
   locking the frequency of the reference CDMA pilot signal and the timing reference signal to a common frequency reference;
   combining the reference CDMA pilot signal the pilot signal generated by the base station; and
   determining the time offset between the reference CDMA pilot signal and the pilot signal generated by the base station.

4. The method of claim 3, wherein the timing difference between the reference CDMA pilot signal and the pilot signal generated by the base station is determined using a mobile device having a pilot searcher.

5. The method of claim 3, wherein the reference CDMA pilot signal is generated by a base station simulator.

6. The method of claim 3, wherein the timing reference signal is a signal indicating the GPS time clock 1 PPS tick.

7. The method of claim 3, wherein the common frequency reference is a 10 MHz output from a GPS receiver.

8. The method of claim 3, wherein the timing reference signal is generated by the GPS receiver.

9. The method of claim 3, wherein the combining of the reference CDMA pilot signal and the pilot signal generated by the base station is an RF combining.

10. The method of claim 1 wherein offsetting a relative timing of the signal transmitted from the base station with respect to a reference signal comprises:
    determining the relative timing of a pilot signal with respect to a timing reference signal, the pilot signal being generated by the base station and transmitted through a transmission antenna, comprising:
    receiving the pilot signal generated by the base station in a pilot signal receiver having an antenna, the transmission delay between the antenna of the receiver and the transmission antenna of the base station being known;
    storing the received pilot signal;
    calibrating the delay from the antenna of the receiver to a digitizing converter;
    triggering the reception and storage of the pilot signal with a signal based upon a known timing relationship with the timing reference signal; and processing the stored data to determine the relationship between the received signal and the timing reference signal.

11. The method of claim 10, wherein the received pilot signal is digitized prior to being stored.

12. The method of claim 10, wherein the timing reference signal is a signal indicating the GPS time clock 1 PPS tick.

13. The method of claim 12, wherein the reception and storage of the received signal is triggered at a known time with respect to the GPS time clock 1 PPS tick.

14. The method of claim 12, wherein the reception and storage of the received signal is triggered at the GPS time clock 1 PPS tick.

* * * * *